July 7, 1936.        J. E. CLARK        2,047,059
STEERING STABILIZER
Filed Jan. 28, 1935
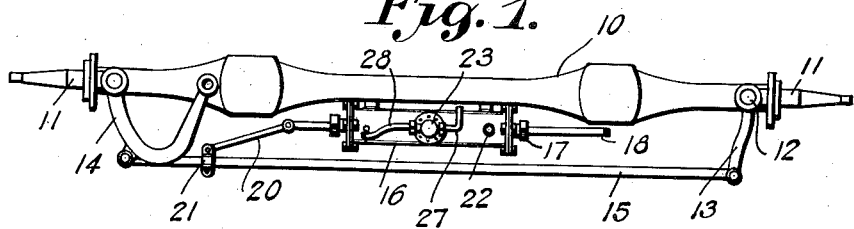
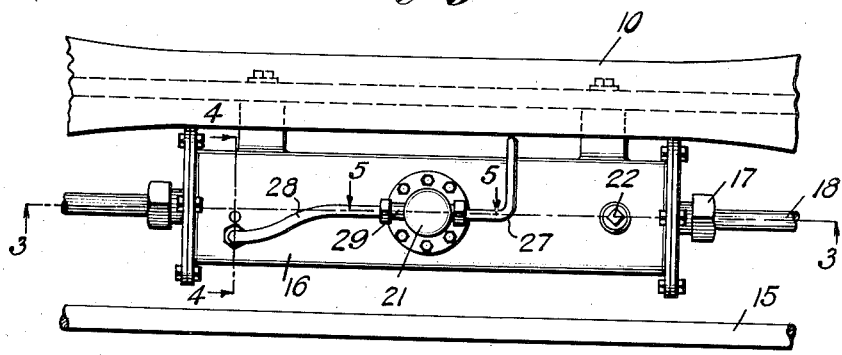
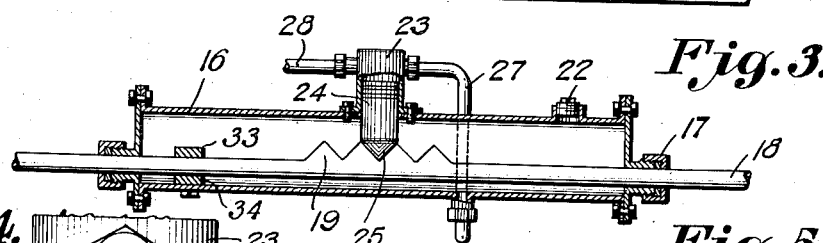
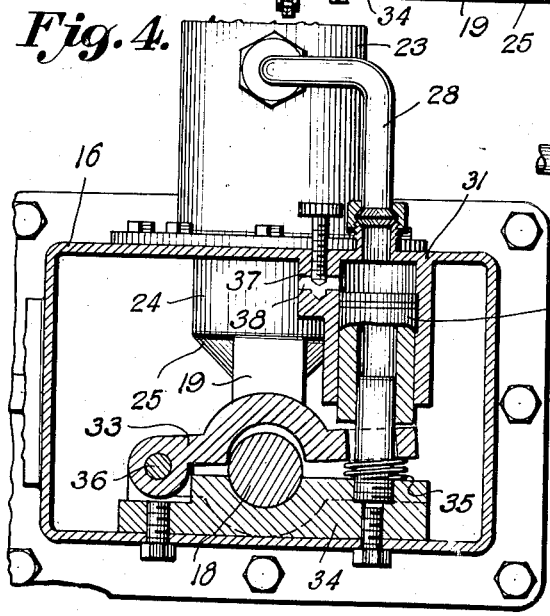
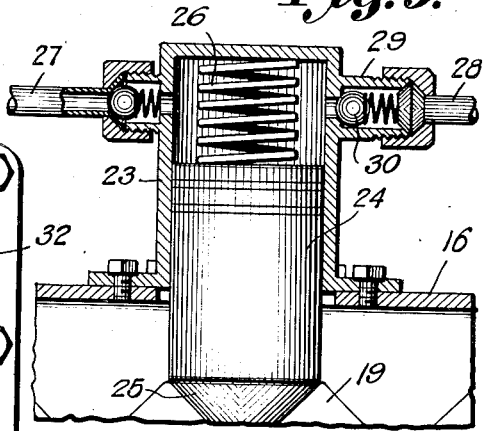
J. E. Clark, INVENTOR
BY Victor J. Evans & Co.
ATTORNEY Patented July 7, 1936

2,047,059

UNITED STATES PATENT OFFICE 2,047,059

STEERING STABILIZER

Jess E. Clark, Okmulgee, Okla.

Application January 28, 1935, Serial No. 3,833

5 Claims. (Cl. 280—90)

The invention relates to a stabilizer and more especially to a steering stabilizer for use in connection with the front or steering wheels of an automobile or the like.

The primary object of the invention is the provision of a stabilizer of this character, wherein the front wheels of an automobile can be made steady so as to have the vehicle guided in a straight or constant course without liability of the shimmying of the front wheels or the vibration resultant in wobbling of the front wheels during the travel of the vehicle.

Another object of the invention is the provision of a stabilizer of this character, wherein resistance to the steering wheel is automatically removed when turning the vehicle in either direction and on the travel of such vehicle in a straight path the steering wheels will be prevented from wobbling or shimmying and the resultant vibration incident thereto will be relieved from the steering wheels, so that the steering wheels will be caused to travel straight in the course of the vehicle and thus resistance of unnecessary or undesirable oscillation of the steering wheels is eliminated.

A further object of the invention is the provision of a stabilizer of this character, which is comparatively simple in construction, readily and easily applied to a motor vehicle, thoroughly reliable and effective in its operation, automatic in action, strong, durable, and inexpensive to manufacture and install.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing:

Figure 1 is a top plan view of a steering wheel assembly including the stationary front axle of a motor vehicle, showing the stabilizer constructed in accordance with the invention applied.

Figure 2 is a fragmentary plan view on an enlarged scale of the stabilizer.

Figure 3 is a sectional view on the line 3—3 of Figure 2 looking in the direction of the arrows.

Figure 4 is an enlarged sectional view on the line 4—4 of Figure 2 looking in the direction of the arrows.

Figure 5 is a fragmentary vertical sectional view of adjuncts of the stabilizer showing the relation of the cams and the piston cooperating therewith.

Similar reference characters indicate corresponding parts throughout the several views in the drawing.

Referring to the drawing in detail, 10 designates generally the front stationary axle of a motor vehicle having the wheel spindles 11 with their turning knuckles 12 provided with the arms 13 and 14, respectively, joined through the medium of the customary connecting rod 15, so that the spindles 11 will simultaneously turn when operating the motor vehicle in the steering thereof through the conventional hand steering wheel (not shown), all of these parts being of conventional or standard kind.

Mounted upon the stationary axle 10 is the stabilizer which comprises a housing 16 constituting a fluid reservoir, and reciprocatingly mounted in this housing 16 and working through suitable packing glands 17 at opposite ends thereof is a cam rod 18 which, intermediate thereof, carries the rack-like series of cams 19 and one end of this rod has pivoted thereto a link 20 which is also pivoted to a clip 21 made secure upon the connecting rod 15 so that on movement of this rod 15 like movement will be imparted to the cam rod 18 for a purpose presently described. The housing 16 at its top carries a removable plug 22 so that fluid, such as oil, can be introduced within said reservoir.

Built upon the housing 16 is a piston cylinder 23 having therein the piston 24 provided with the lower tapered cam-engaging end 25 for coaction with the series of cams 19, so that the said piston 24 may be operated within the cylinder 23. The cylinder 23 has fitted therein a weak coiled tensioning spring 26 which plays upon the piston 24 to urge the same into positive engagement with the cams 19 on the cam rod 18.

Leading from the housing 16 at opposite sides of the cylinder 23 are intake and discharge conduits 27 and 28, respectively, these at the nipple connection 29 with the cylinder 23 having fitted spring seated return check valves 30. On the downward movement of the piston 24 in the cylinder 23 fluid will be drawn from the reservoir 16 into the said cylinder 23 and on the up stroke of the piston 24 the fluid within the cylinder will be delivered through the conduit 28. This conduit 28 opens into a cylinder 31 formed within the housing 16 having therein a plunger 32 which is moved by fluid pressure to operate upon the movable jaw 33 of a braking clamp, its stationary jaw 34 being made fast or fixed within the housing 16 and these jaws being about the rod 18 so that when the jaw 33 is moved toward the jaw 34, braking action will be had upon the rod 18 and thus preventing oscillation of this rod incident to the wobbling or shimmying of the wheels of the vehicle. Interposed between the jaws 33 and 34 is an expanding spring 35 which functions to elevate the jaw 33 or open it with relation to the jaw 34 and thus relieve braking action on the rod 18 when the plunger 32 relieves pressure on the jaw 33 which is pivoted, at 36, to the stationary jaw 34. The cylinder 31 in the thickened wall 37 thereof has a by-passage 38 which is arranged above the top or inner head of the plunger 32 and such passage is regulated by a needle valve 39 and through this passage the fluid from the cylinder 31 is delivered back into the reservoir 16 when the plunger 32 rises within the cylinder 31, as will be apparent in Figure 4 of the drawing.

The piston 24 working in the cylinder 23 operates as a pump through the instrumentality of the cams 19 on the cam rod 18 which is rapidly reciprocated by the wobbling or shimmying of the steering wheels of the vehicle.

On the turning of the steering wheels of the vehicle to either side of a direct straight course as in turning the vehicle at a corner or in a course at an angle to its straight course the piston 24 will ride over the cams 19 to a point beyond the same so that there will be no resistance had at the steering wheel in the guiding of the vehicle in its course. Such movement of the cam carrying rod 18 is gentle when compared with rapid movement of such rod when the wheels of the vehicle shimmy, and consequently the slight compression by the piston 24 in its cylinder 23 is hardly sufficient to draw fluid through the conduit 27 or to deliver any fluid thus sucked into the cylinder through the conduit 28 to act upon the plunger 32 and any such fluid will find an outlet through the port 38. The spring 35, it is to be understood, normally swings the braking jaw 33 away from the rod 18 and also moves the plunger 32 upwardly in its cylinder and it is only when the wheels of the vehicle wobble or shimmy to an extent as to impart a rapid reciprocatory movement to the connecting rod 15 and a like rapid longitudinal movement to the cam carrying rod 18 that the piston 24 is reciprocated with sufficient rapidity as to suck fluid into its cylinder and to direct the same therefrom through the conduit 28 in sufficient volume and density to act on the plunger 32 to cause the latter to swing the braking jaw against the pressure of the spring 35 against the rod 18 to braking position. After the shimmying of the wheels of the vehicle has been halted, oil in the cylinder 32 will be directed through the port 38 back into the reservoir 16 and the spring 35 will return the braking jaw 33 and the plunger 32 to normal inoperative position.

On any oscillatory action as may be set up when the vehicle is traveling in a straight course through the instrumentality of the stabilizer, this oscillation will be eliminated under the action of the braking clamp upon the cam rod 18, so that shimmying or wobbling of the wheels will be avoided.

What is claimed is:

1. A stabilizer of the character described comprising a fluid reservoir for mounting upon the front axle of a vehicle, a cam rod reciprocatingly mounted in said reservoir and having connection with a connecting rod of steering wheels of the vehicle, braking means located within the reservoir for action upon the cam rod for holding said rod from free or accidental movement, a fluid pump actuated by the cam rod and receiving fluid from the reservoir, and fluid pressure means having connection with said pump for regulating the braking means.

2. The combination of a fluid pump, a cam rod actuating said pump and having connection with a connecting rod of steering wheels, braking mechanism for said cam rod for holding said rod from free or accidental movement and controlled by fluid pressure from the pump, a fluid reservoir having communication with the pump for supplying fluid thereto, means for delivering fluid from the fluid pressure means into the reservoir, and means for releasing the braking means on the freeing of the fluid from the fluid pressure means into the reservoir.

3. The combination of a fluid pump, a cam rod actuating said pump and having connection with a connecting rod of steering wheels, braking mechanism for said cam rod for holding said rod from free or accidental movement and controlled by fluid pressure from the pump, a fluid reservoir having communication with the pump for supplying fluid thereto, means for delivering fluid from the fluid pressure means into the reservoir, means for releasing the braking means on the freeing of the fluid from the fluid pressure means into the reservoir, and a series of cams on the cam rod for coaction with the pump.

4. An automobile steering stabilizer, comprising an oil reservoir secured to the front axle of an automobile, a fluid pump having a spring influenced plunger in the reservoir, and said pump having valve controlled intake and discharge conduits which communicate with the reservoir, a stabilizer rod movable through the reservoir and having a link connection with the steering knuckle connecting rod for the axle, and a plurality of cams on the stabilizer rod to engage with the plunger.

5. The automobile steering stabilizer as claimed in claim 4, and a pivotally supported jaw to engage with the stabilizer rod to hold said rod from free or accidental movement, spring means influencing the jaw away from the rod, a fluid actuated plunger for moving the jaw against the rod, a casing for said plunger having a needle valve controlled by-pass communicating with the reservoir and said casing having the pump discharge conduit connected thereto above the plunger therein.

JESS E. CLARK.